(12) United States Patent
Koito et al.

(10) Patent No.: US 8,355,108 B2
(45) Date of Patent: Jan. 15, 2013

(54) LIQUID-CRYSTAL DISPLAY DEVICE AND METHOD OF MANUFACTURING SAME

(75) Inventors: Takeo Koito, Kanagawa (JP); Koichi Nagasawa, Aichi (JP); Shuji Hayashi, Kanagawa (JP); Hidehiro Kosaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 177 days.

(21) Appl. No.: 12/510,402

(22) Filed: Jul. 28, 2009

(65) Prior Publication Data

US 2010/0033668 A1 Feb. 11, 2010

(30) Foreign Application Priority Data

Aug. 6, 2008 (JP) .................................. 2008-203433

(51) Int. Cl.
G02F 1/1339 (2006.01)
(52) U.S. Cl. ......... 349/155; 349/156; 345/104; 345/173
(58) Field of Classification Search .................. 349/155, 349/156; 345/104, 173
See application file for complete search history.

(56) References Cited

U.S. PATENT DOCUMENTS

| 6,573,969 | B1 * | 6/2003 | Watanabe et al. | 349/155 |
| 6,724,452 | B1 * | 4/2004 | Takeda et al. | 349/139 |
| 7,274,424 | B1 * | 9/2007 | Kurihara et al. | 349/155 |
| 2004/0212599 | A1 * | 10/2004 | Cok et al. | 345/173 |
| 2005/0099578 | A1 * | 5/2005 | Kim et al. | 349/155 |
| 2008/0100590 | A1 * | 5/2008 | Hur et al. | 345/173 |
| 2008/0239214 | A1 * | 10/2008 | Lee et al. | 349/106 |
| 2009/0115954 | A1 * | 5/2009 | Tseng et al. | 349/156 |
| 2009/0167703 | A1 * | 7/2009 | You et al. | 345/173 |
| 2009/0237365 | A1 * | 9/2009 | Choi et al. | 345/173 |

FOREIGN PATENT DOCUMENTS

| JP | HEI 08-114809 A | 5/1996 |
| JP | HEI 11-264968 A | 9/1999 |
| JP | 2000-206541 A | 7/2000 |
| JP | 2000-314886 A | 11/2000 |
| JP | 2001-075074 A | 3/2001 |
| JP | 2001-296530 A | 10/2001 |
| JP | 2001-305557 A | 10/2001 |
| JP | 2003-186023 A | 7/2003 |
| JP | 2004-271590 A | 9/2004 |
| JP | 2006-154815 A | 6/2006 |
| JP | 2007-095044 | 4/2007 |
| JP | 2007-128091 A | 5/2007 |
| JP | 2007-316363 A | 12/2007 |
| JP | 2008-102303 A | 5/2008 |
| JP | 2008-116938 A | 5/2008 |
| JP | 2008-165181 A | 7/2008 |

OTHER PUBLICATIONS

Japanese Patent Office, Office Action issued in Patent Application JP 2008-203433, on May 11, 2010.

* cited by examiner

*Primary Examiner* — Edward Glick
*Assistant Examiner* — Sang Nguyen
(74) *Attorney, Agent, or Firm* — SNR Denton US LLP

(57) ABSTRACT

A liquid-crystal display device includes a first substrate; a second substrate formed so as to oppose the first substrate; a liquid-crystal layer with a predetermined thickness, the liquid-crystal layer being formed between the first substrate and the second substrate; a planarization film for planarizing the surface of the liquid-crystal layer, the planarization film being formed on the surface of at least one of the first substrate and the second substrate, the surface facing the liquid-crystal layer; and projecting parts that are integrally formed with the planarization film.

10 Claims, 10 Drawing Sheets

LIQUID-CRYSTAL DISPLAY DEVICE AND METHOD OF MANUFACTURING SAME

BACKGROUND OF THE INVENTION

1. Field of the Invention

The present invention relates to a liquid-crystal display device and a method of manufacturing the liquid-crystal display device.

2. Description of the Related Art

Liquid-crystal display devices have advantages, such as low profile, light weight, and low power consumption. Thus, liquid-crystal display devices have been often used in mobile electronic devices, such as mobile phones or digital cameras. Liquid-crystal display devices include a liquid-crystal panel having a liquid-crystal layer sealed between a pair of substrates, so that light emitted from a planar light source, such as a backlight, provided on the back side of the liquid-crystal panel, is modulated by the liquid-crystal panel. Then, the modulated light enables an image to be displayed on the front side of the liquid-crystal panel.

In recent years, liquid-crystal display devices including a touch panel via which content designated by a user can be input by the user by directly touching an icon displayed on the screen of a liquid-crystal display device have been used.

This touch panel is disposed on the uppermost side of the liquid-crystal display device so that the designated content shown on the screen of the liquid-crystal display device can be selected by directly touching it with the hand of a person or with an object. In the touch panel, the position at which the hand or the object contacts therewith is detected, and by using the content designated at the contact position as an input signal, the liquid-crystal display device is driven. It is not necessary for a liquid-crystal display device including a touch panel to separately have an input device, such as a keypad, in a case where it is used in a computer or the like, is used in an input device, such as a keyboard or a mouse, or is used in a mobile product, such as a mobile phone. As a consequence, touch panels are increasingly being used.

On the other hand, in products including a touch panel as a result of being arranged on the liquid-crystal display device, a decrease in optical characteristics occur due to an increase in device thickness or size and due to influences of the refraction surface. Furthermore, there is a problem of an increase in the manufacturing cost due to the fact that a touch panel is necessary in addition to the liquid-crystal display device, and it has been suggested that the liquid-crystal display device and the touch panel be integrally formed.

In recent years, such liquid-crystal display devices having a so-called sensor function, in which a liquid-crystal display device and a touch panel are integrally formed, have been proposed. In one liquid-crystal display device having a sensor function, in Japanese Unexamined Patent Application Publication No. 2007-95044 described below, a method has been described in which an external pressure that is generated when a hand or an object contacts the liquid-crystal panel of a liquid-crystal display device is detected by electrical contact between a pair of substrates forming the liquid-crystal panel.

FIG. 10 shows a schematic configuration of a liquid-crystal display device 100 having a sensor function of the related art. The liquid-crystal display device 100 having a sensor function of the related art is configured to include an array substrate 101, an opposing substrate 102 provided so as to oppose the array substrate 101, and a liquid-crystal layer 103 provided between the array substrate 101 and the opposing substrate 102.

The array substrate 101 will be described first.

The array substrate 101 is configured to have an insulation substrate 104 formed from glass in the shape of a transparent rectangular flat plate, and thin-film transistors (hereinafter TFTs) 107 formed of a plurality of switching elements that are formed so as to correspond to pixels on the insulation substrate 104. Then, on the TFT 107, a pixel electrode 106 that is connected to the TFT 107 through a contact part 118 formed on a planarization film 105 for covering the TFT 107 so as to achieve planarization is pattern-formed on the planarization film 105. Furthermore, an orientation film 108 is provided on the pixel electrode 106.

Next, a description will be given of the opposing substrate 102.

The opposing substrate 102 includes a transparent insulation substrate 109, such as glass or polycarbonate (PC), a color filter layer 110 formed on one main surface of the insulation substrate 109, and a planarization film 111 formed on the color filter layer 110. Furthermore, a sensor adjustment layer 115 in a projecting form, and a common electrode 112 formed on the entire surface including the sensor adjustment layer 115 are provided on the planarization film 111. Furthermore, a spacer layer 114 formed to maintain the thickness of the liquid-crystal layer 103, and an orientation film 113 formed on the entire surface excluding the spacer layer 114 are provided at a predetermined position on the common electrode 112.

The color filter layer 110 is formed of a resin film in which dyes or pigments having the three primary colors of red (R), green (G), and blue (B) are contained.

The planarization film 111 is used to planarize the surface of the color filter layer 110 and is formed from a light-transmitting material.

The sensor adjustment layer 115 is formed in a projecting form at a predetermined position on the planarization film 111, and is formed to have a value smaller than the cell thickness (the thickness of the liquid-crystal layer 103). The common electrode 112 is formed on the entire surface containing this sensor adjustment layer 115. In an example of the related art, a sensor electrode 116 is formed by the common electrode 112 formed on this sensor adjustment layer 115.

Furthermore, the spacer layers 114 are formed in a spaced manner at equal intervals on the common electrode 112, and are formed in a columnar shape at a predetermined height of a cell thickness. These spacer layers 114 enable the cell thickness between the array substrate 101 and the opposing substrate 102 to be maintained.

The opposing substrate 102 and the array substrate 101 are formed so as to maintain a predetermined cell thickness and so as to oppose each other in such a manner that the respective orientation films 108 and 113 face inwardly. This cell thickness is maintained constant on the surface by the height of the spacer layer 114, and as a result of a predetermined liquid-crystal material being sealed within this cell thickness, the liquid-crystal layer 103 is formed.

In the liquid-crystal display device 100 having the above configuration, the sensor electrode 116 and the pixel electrode 106 at a position opposing the sensor electrode 116 constitute a touch sensor.

In the liquid-crystal display device 100 shown in FIG. 10, pressure is applied by pressing the opposing substrate 102 using a touch object 117, such as a hand or a finger. Then, the sensor electrode 116 is brought into contact with the pixel electrode 106 of the array substrate 101 opposing the sensor electrode 116 via the orientation films 108 and 113. By detecting contact between the sensor electrode 116 and the pixel electrode 106, it is possible to detect the position touched by the touch object.

In such a liquid-crystal display device 100 having a sensor function of the related art, the electrical connection of the sensor electrode 116 and the pixel electrode 106 enables the position touched by the touch object 117 to be detected. Thus, the smaller the distance between the two electrodes, the easier the detection of the touched position with the application of a small external pressure. For this reason, for the liquid-crystal display device 100 having a sensor function of the related art, as shown in FIG. 10, many examples can be seen in which a sensor adjustment layer 115 formed in a projecting form is formed on the planarization film 111, and the height of the sensor electrode 116 is adjusted.

However, regarding the area of bonding between such a sensor adjustment layer 115 in a projecting form and the planarization film 111 that is a layer below the sensor adjustment layer 115, securing of the bonding strength is difficult because the bonding area is often a very small area on the order of several microns in diameter.

Furthermore, the spacer layer 114 in a columnar shape is often formed on the common electrode 113. In general, the degree of contact between the common electrode 113 and the spacer layer 114 is weak, and the spacer layer 114 is easily peeled off.

SUMMARY OF THE INVENTION

As described above, in a configuration in which an external pressure is directly applied from above the display screen of the liquid-crystal display device 100 so as to detect the position at which the external pressure has been applied, since the liquid-crystal display device 100 directly receives the external pressure, it is necessary to make the liquid-crystal display device 100 resistant to an external pressure. However, as described above, in the liquid-crystal display device 100 of the related art, a structure body, such as the spacer layer 114, the sensor adjustment layer 115, or the like, formed on the opposing substrate 102, is easy to peel off. In particular, in a case where a test in which physical strength is demanded, such as a keying test, a slide test, or the like, is performed, there is a case in which the sensor adjustment layer 115 in a projecting form, which is formed in the layer below the sensor electrode 116 that works as a touch sensor, is peeled off from the surface of the opposing substrate 102. Then, bright spots or dark spots occur in a displayed image, and a display defect and a sensor sensitivity defect occur. Furthermore, occurrence of gap variation due to peeling of the spacer layer 114, and occurrence of a foreign body within a cell due to peeling of a structure body become problems.

In addition, in recent years, use in an environment in which pressure and impact onto the display screen of a liquid-crystal display device are applied more than before owing to low profile of liquid-crystal display devices and light weight thereof because of use of an FF (Film-Film) touch panel has increased. Furthermore, at present, when electronic devices that use liquid-crystal display devices have been expanded, there has been a demand for liquid-crystal display devices that can withstand pressure and impact onto the display screen.

It is desirable to provide a liquid-crystal display device having a cell structure resistant to an external pressure and a method of manufacturing the liquid-crystal display device.

According to an embodiment of the present invention, there is provided a liquid-crystal display device including: a first substrate; a second substrate formed so as to oppose the first substrate; a liquid-crystal layer with a predetermined thickness, the liquid-crystal layer being formed between the first substrate and the second substrate; a planarization film for planarizing the surface of the liquid-crystal layer, the planarization film being formed on the surface of at least one of the first substrate and the second substrate, the surface facing the liquid-crystal layer; and projecting parts that are integrally formed with the planarization film.

In the liquid-crystal display device according to the embodiment of the present invention, the projecting parts are integrally formed with a planarization film. As a result, the bonding surface between the projecting parts and the first substrate or the second substrate is increased, and the peel strength from the first substrate or the second substrate of the projecting part is increased.

According to another embodiment of the present invention, there is provided a method of manufacturing a liquid-crystal display device, the method including the steps of: preparing a first substrate on which a plurality of thin-film transistors are formed; preparing a second substrate with which the first substrate is laminated, with a liquid-crystal layer having a predetermined thickness being interposed therebetween; and forming a planarization film on the surface of at least one of the first substrate and the second substrate facing the liquid-crystal layer, and forming projecting parts in a projecting form in such a manner as to be integral with the planarization film.

In the method of manufacturing a liquid-crystal display device according to the embodiment of the present invention, the projecting parts are integrally formed with the planarization film. As a result, the bonding surface between the projecting parts and the first substrate or the second substrate is increased, and the peel strength of the projecting parts from the first substrate or the second substrate is increased. Furthermore, in the embodiment of the present invention, since projecting parts are integrally formed with a planarization film, the formation of the projecting parts and the formation of the planarization film can be performed at a time, thereby making it possible to reduce the number of steps.

According to embodiments of the present invention, it is possible to obtain a liquid-crystal display device that is resistant to an external pressure and that has high reliability.

DESCRIPTION OF THE PREFERRED EMBODIMENTS

Embodiments of the present invention will be described below with reference to the drawings.

First Embodiment

Figure 1:
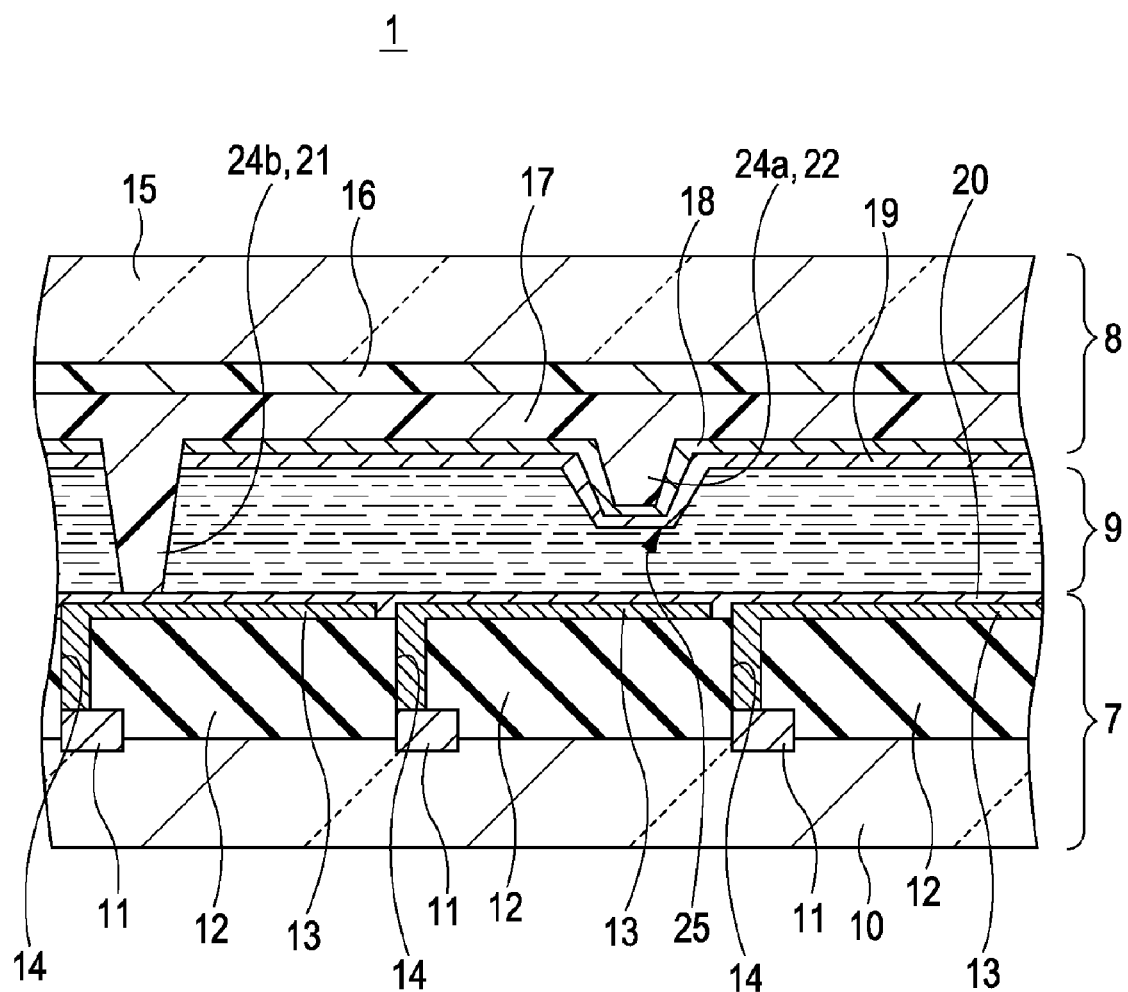
FIG. 1 is a schematic cross-sectional diagram of a liquid-crystal display device according to a first embodiment of the present invention.

FIG. 1 shows a schematic configuration of a liquid-crystal display device 1 according to a first embodiment of the present invention. The liquid-crystal display device 1 according to the present exemplary embodiment is a liquid-crystal display device having a sensor function capable of detecting the position at which a display screen is touched.

The liquid-crystal display device 1 according to the present exemplary embodiment has an array substrate 7, which is a first substrate on the side where a plurality of thin-film transistors (hereinafter TFTs) 11 are formed, and an opposing substrate 8, which is a second substrate provided so as to oppose the array substrate 7. Then, the liquid-crystal display device 1 is constituted by the array substrate 7, the opposing substrate 8, and a liquid-crystal layer 9 having a predetermined thickness, which is formed between the two substrates. In the following, the array substrate 7, the opposing substrate 8, and the liquid-crystal layer 9 will be described in this order.

The array substrate 7 is configured to include an insulation substrate 10 formed from glass or the like in the shape of a transparent rectangular flat plate, and a plurality of TFTs 11 formed on the surface of the insulation substrate 10 facing the liquid-crystal layer 9. A plurality of TFTs 11 are provided in an array in such a manner as to correspond to pixels, and are used as switching elements. Then, a planarization film 12 is formed on the entire surface of the insulation substrate 10 in such a manner as to cover the TFTs 11. This planarization film 12 is formed with contact parts 14 from each of which a portion of the TFT 11 is exposed. This planarization film 12 is formed so as to planarize the portion other than the contact parts 14 on the surface of the array substrate 7 facing the liquid-crystal layer 9. Furthermore, on the planarization film 12, a pixel electrode 13 is pattern-formed in such a manner as to correspond to a corresponding one of the pixels. The respective pixel electrodes 13 are connected to the TFTs 11 that are switching elements via the contact parts 14 formed on the planarization film 12. These pixel electrodes 13 is formed so as to be transparent electrodes and are formed using, for example, ITO (Indium Tin Oxide).

Furthermore, on the pixel electrodes 13, an orientation film 20 is formed on the entire surface that covers the pixel electrodes 13.

The opposing substrate 8 is constituted by a transparent insulation substrate 15, such as glass or polycarbonate (PC), a color filter layer 16 formed on the surface of the insulation substrate 15 facing the liquid-crystal layer 9, and a planarization film 17 formed on the color filter layer 16. Then, the opposing substrate 8 has projecting parts 24a and 24b that are integrally formed with the planarization film 17. In the present exemplary embodiment, the projecting parts 24a and 24b constitute a sensor adjustment layer 22 and a spacer layer 21, respectively. On the entire surface excluding this spacer layer 21, a common electrode 18 is formed, and an orientation film 19 is formed on the common electrode 18.

The color filter layer 16 is formed of a resin film in which dyes or pigments having the three primary colors of red (R), green (G), and blue (B) are contained.

The planarization film 17 is formed so as to planarize the surface of the opposing substrate 8 facing the liquid-crystal layer 9. In particular, the surface excluding the projecting parts 24a and 24b that are integrally formed with the planarization film 17 is made flat. The spacer layer 21 and the sensor adjustment layer 22 that are formed of the projecting parts 24a and 24b, respectively, are preferably formed at a position at which they are light-shielded by a light-shielding film (not shown) or the like in the liquid-crystal display device 1. The spacer layer 21 is formed so as to maintain the thickness of the liquid-crystal layer 9, that is, the cell thickness, so as to be constant within the plane, and is formed at a height at which the cell thickness reaches a predetermined thickness.

The sensor adjustment layer 22 is formed to be lower than the spacer layer 21, and the pixel electrode 18 formed on the sensor adjustment layer 22 is formed as a sensor electrode 25. That is, the sensor adjustment layer 22 is used to achieve the height of the sensor electrode 25 formed on the side of the opposing substrate 8.

A description will be given below, with reference to FIGS. 2A to 2D, of a method of manufacturing the opposing substrate 7 having the above configuration.

Figure 2A:
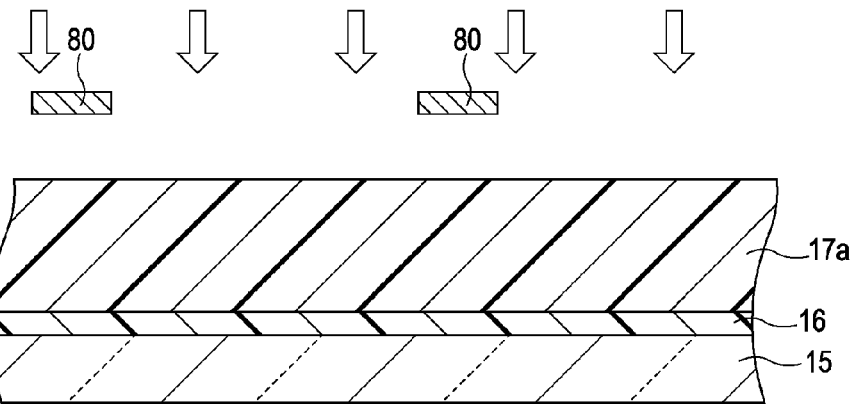
FIGS. 2A, 2B, 2C, and 2D are manufacturing step diagrams of the liquid-crystal display device according to the first embodiment of the present invention.

First, as shown in FIG. 2A, the color filter layer 16 is formed on the insulation substrate 15, and a photosensitive resin film 17a having a predetermined thickness is formed thereon. For the material of the photosensitive resin film 17a, a positive or negative photosensitive resin material can be used. In the present exemplary embodiment, a positive photosensitive resin material is used. Then, portions that become the above-described spacer layer 21 and sensor adjustment layer 22 within the photosensitive resin film 17a formed in the manner described above are light-shielded using a mask 80, and are exposed to light.

Figure 2B:
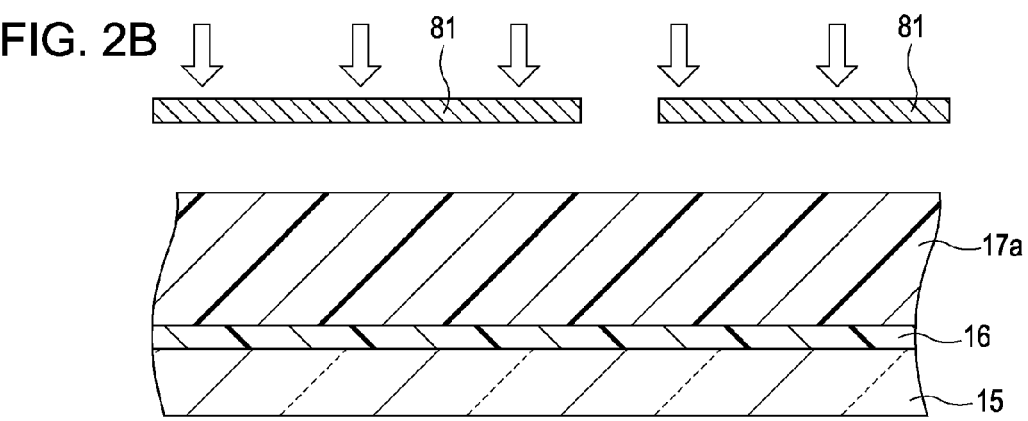
Figure 2C:
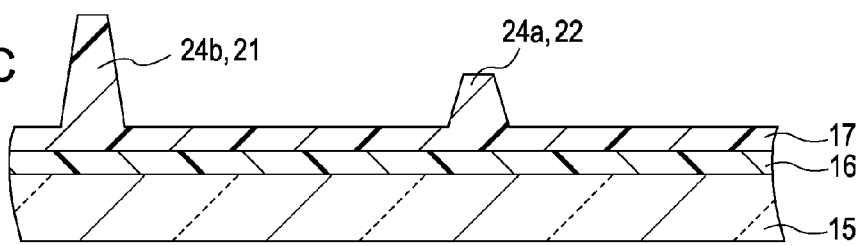

Next, as shown in FIG. 2B, only a portion that serves as the sensor adjustment layer 22 within the photosensitive resin film 17a is light-shielded using a mask 81 and is exposed to light. Thereafter, after undergoing a development step, as shown in FIG. 2C, the planarization film 17, and projecting parts 24a and 24b that serve as the sensor adjustment layer 22 and the spacer layer 21, respectively, which are integrally formed with the planarization film 17, are formed. As described above, by light-exposing the photosensitive resin film 17a two times, it is possible to form the projecting parts 24a and 24b having different heights, and it is possible to form the sensor adjustment layer 22 and the spacer layer 21 so as to reach desired respective heights.

In general, there has been a demand for ease of control to such a degree that the projecting part 24a that affects sensor sensitivity is a little lower than the projecting part 24b that serves as the spacer layer 21 and the height thereof is approximately 0.2 to 0.5 μm. According to the present exemplary embodiment, it is possible to control the heights of the projecting parts 24a and 24b to be formed by adjusting only the amount of exposure to light, and it is possible to form the projecting parts 24a and 24b with high accuracy.

Figure 2D:
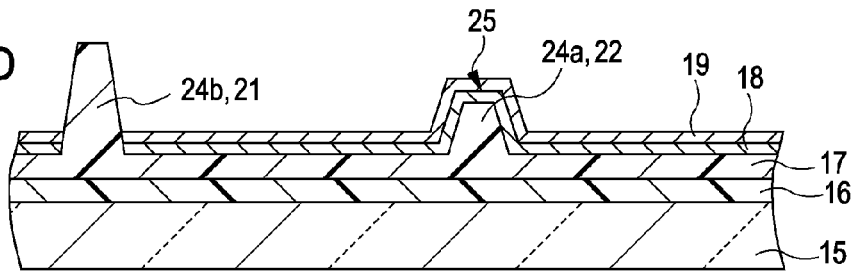

After that, as shown in FIG. 2D, the common electrode 18 and the orientation film 19 are formed on the entire surface excluding a portion that becomes the spacer layer 21. The common electrode 18 is formed as a transparent electrode; for example, ITO can be used.

As a result of the above steps, the opposing substrate 8 in which the projecting parts 24a and 24b and the planarization film 17 are integrally formed is completed. In the manufacturing method of the present exemplary embodiment, an example is described in which after undergoing two times of exposure-to-light steps, the projecting parts 24a and 24b having different heights are formed. Alternatively, in an exposure-to-light step, by using a halftone mask that controls the amount of exposure to light that is transmitted, it is also possible to form the projecting parts 24a and 24b having different heights. In a case where a halftone mask is used, it is possible to reduce the number of masks, and it is also possible to shorten the manufacturing time.

In the method of manufacturing the liquid-crystal display device 1 of the present exemplary embodiment, since the planarization film 17 and the projecting parts 24a and 24b are integrally formed, it is not necessary to form the projecting parts 24a and 24b and the planarization film 17 in separate steps unlike the related art, thereby reducing the number of steps.

The above-described array substrate 7 and opposing substrate 8 are laminated with a seal agent (not shown) in a state in which the cell thickness in an amount corresponding to the height of the spacer layer 21 is maintained so that their respective orientation films 20 and 19 face inward.

The liquid-crystal layer 9 is formed in such a manner that a liquid crystal is sealed between the array substrate 7 and the opposing substrate 8 that are arranged so as for their respective orientation films 20 and 19 to face each other. The distance between the array substrate 7 and the opposing substrate 8, that is, the cell thickness, is specified by the height of the spacer layer 21, and the cell thickness reaches the thickness of the liquid-crystal layer 9. In the liquid-crystal display device 1 of the present exemplary embodiment, by patterning the pixel electrode 13 on the side of the array substrate 7, a short-circuit is not made. Alternatively, the common electrode 18 on the side of the opposing substrate 9 may be pattern-formed.

In the liquid-crystal display device 1 of the present exemplary embodiment, the surface of the opposing substrate 8 opposite to that of the liquid-crystal layer 9 is used as a display screen. Furthermore, in the present exemplary embodiment, the pixel electrode 13 at a position opposing the sensor electrode 25 constitutes the opposing electrode according to an embodiment of the present invention. Then, in the liquid-crystal display device 1 of the present exemplary embodiment, the sensor electrode 25 formed on the opposing substrate 8 and the pixel electrode 13 (opposing electrode) on the array substrate 7 formed at a position opposing the sensor electrode 25 constitute a touch sensor.

The touch sensor is used to detect an external pressure applied onto the display screen, and is capable of detecting the touched position when pressure is applied onto the display screen by a touch object, such as a hand or a finger.

In the liquid-crystal display device 1 having the above configuration, by applying a voltage between the common electrode 18 and the pixel electrode 13, the state in which the liquid crystal of the liquid-crystal layer 9 is oriented is changed. Then, for example, light from a light source (not shown), which is emitted from the array substrate 7, is modulated by the liquid-crystal layer 9, thereby causing a desired image to be displayed on the display screen.

Furthermore, in the liquid-crystal display device 1 of the present exemplary embodiment, for example, in a case where pressure is applied by a touch object, such as a hand or a finger, from outside the opposing substrate 8, the opposing substrate 8 is curved toward the array substrate 7. Then, the sensor electrode 25 at the position at which the pressure has been applied is electrically connected to the pixel electrode 13 present at the position opposing the sensor electrode 25. By detecting the positions of the sensor electrode 25 and the pixel electrode 13 that are electrically connected to each other, it is possible to detect the position of the display screen touched by the touch object. In the liquid-crystal display device 1 of the present exemplary embodiment, the contact between the pixel electrode 13 and the sensor electrode 25 formed on the common electrode 18 enables the position of the touched display screen to be detected. Alternatively, in place of the common electrode 18, a sensor electrode may be provided. Furthermore, although the pixel electrode 13 opposing the sensor electrode 25 is used as an opposing electrode according to an embodiment of the present invention, another opposing electrode may be used.

Advantages of the First Embodiment

According to the liquid-crystal display device 1 of the present exemplary embodiment, the projecting parts 24a and 24b that serve as the sensor adjustment layer 22 and the spacer layer 21, respectively, formed on the opposing substrate 8 are integrally formed with the planarization film 17. For this reason, the degree of contact among the opposing substrate 8, the spacer layer 21, and the sensor adjustment layer 22 increases, so that peeling of the spacer layer 21 and the sensor adjustment layer 22, which results from the application of pressure onto the liquid-crystal display device 1, is reduced.

Figure 3:
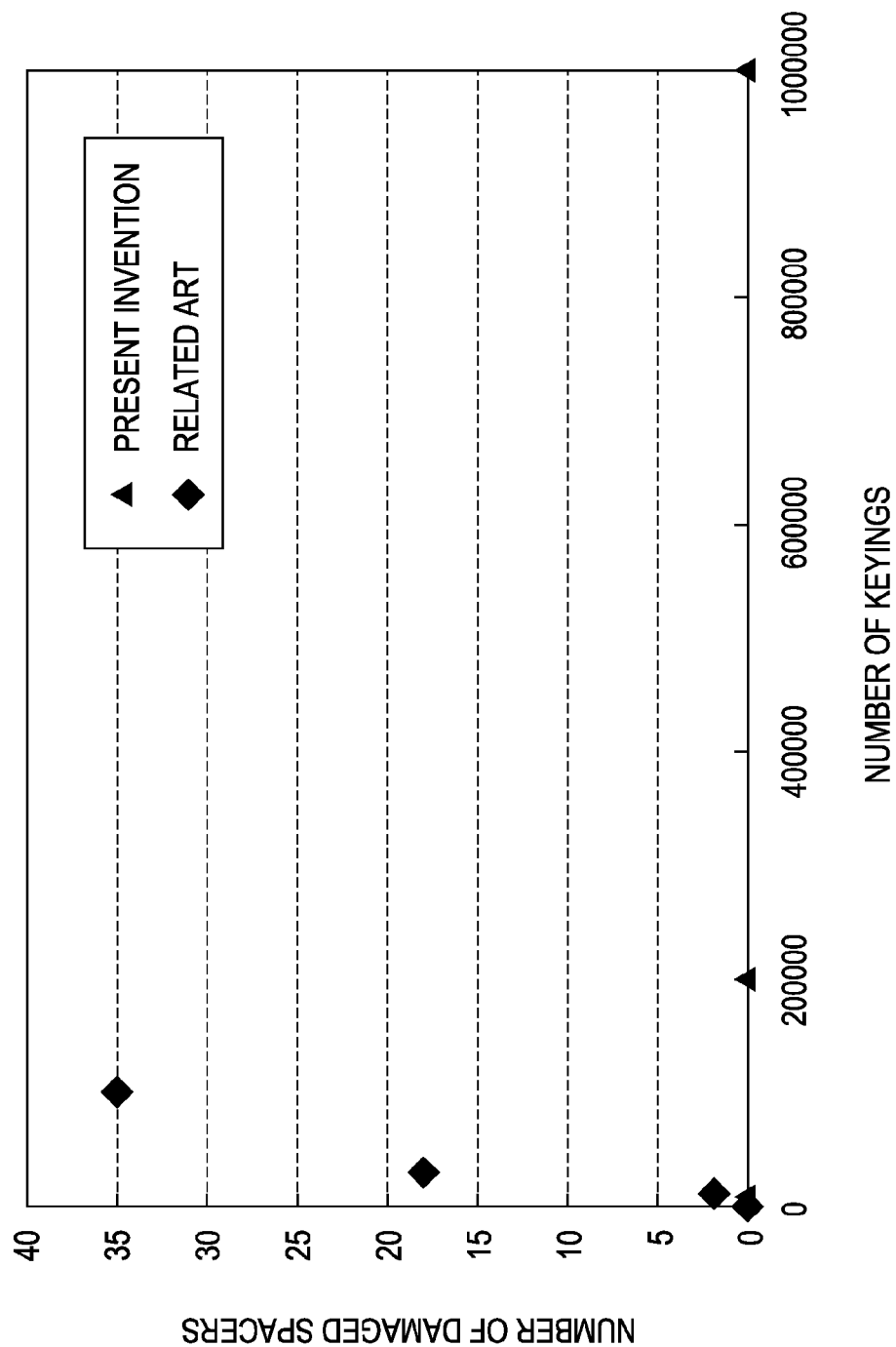
FIG. 3 shows results of keying tests in the liquid-crystal display device in the present invention and in a liquid-crystal display device of the related art.

FIG. 3 shows the results of a keying test performed with respect to a liquid-crystal display device of the related art and the liquid-crystal display device 1 of the present exemplary embodiment. The keying test was performed by using a stylus made of polyacetal with a diameter of 0.8 mm and by keying on the surface of the liquid-crystal display device at a force of 2.5 N. FIG. 3 shows the results in which the number of damaged pieces of the spacer layer was measured on the basis of the number of keyings.

As can be seen from FIG. 3, in the liquid-crystal display device of the related art, damage of spacer layers as a result of about one thousand keyings is seen. However, in the liquid-crystal display device 1 of the present exemplary embodiment, damage of spacer layers was not seen even with one million keyings.

In the liquid-crystal display device of the related art, since a spacer layer and a sensor adjustment layer are in close contact with the surface of a layer below at a very small bonding surface, the bonding surface of the peel surface is small, and these are easily peeled. In comparison, according to the liquid-crystal display device 1 of the present exemplary embodiment, since the projecting parts 24a and 24b that serve as the spacer layer 21 and the sensor adjustment layer 22, respectively, are integrally formed with the planarization film 17, the bonding surface between the projecting parts 24a and 24b and the layer below the projecting parts 24a and 24b is the entire surface of the substrate, and the peel surface is the entire surface, thereby making the liquid-crystal display device resistant to an external pressure.

Furthermore, in the manufacturing method of the present exemplary embodiment, on the opposing substrate 8, the projecting parts 24a and 24b are formed at the same time as the formation of the planarization film 17. Thus, when compared to the method of separately forming a planarization film and projecting parts in the related art, it is possible to reduce the number of steps, and the manufacturing method is advantageous in terms of throughput and yield.

In the liquid-crystal display device 1 of the present exemplary embodiment, an example in which the sensor electrode 25 is formed so as to serve as the liquid-crystal display device 1 having a sensor function is used. In addition, the present exemplary embodiment can be used for a liquid-crystal display device not having a sensor function. Furthermore, in the liquid-crystal display device 1 of the present exemplary embodiment, an example in which the projecting parts 24a and 24b are formed on the opposing substrate 8 is used. Alternatively, the present exemplary embodiment can be applied as appropriate to the structure in which projecting parts are formed on the surface side facing the liquid-crystal layer 9, and may also be formed on the surface side of the array substrate 7. Also, in a case where projecting parts are to be formed on the surface side of the array substrate 7, similarly to the above-described formation of the projecting parts 24a and 24b on the opposing substrate 8, the projecting parts can be formed by light-exposing and developing the planarization film 17 formed from a photosensitive resin material.

As described above, the projecting parts formed on the opposing substrate 8 or on the array substrate 7 cause light to leak during black display, and has an influence on transmission contrast ratio. For this reason, by forming projecting parts in non-opening parts (light-shielding parts) for pixels in the opposing substrate 8 or in the array substrate 7, it is possible to prevent a decrease in the contrast. Furthermore, non-opening parts for pixels can be formed in a signal line in the case of the array substrate 7, and can be formed between adjacent pixels in the case of the opposing substrate 8. In the signal line or between adjacent pixels, in general, the metal wire forming the signal line is 0.3 to 1 μm and thus, the surface rises. Therefore, it is possible to use the rising portion of the surface at the height of the spacer layer 21 and the sensor adjustment layer 22, thereby making it possible to reduce the processing load. That is, it is possible to use the height of the projecting parts 24a and 24b and the thickness of the signal line formed on the array substrate 7.

Furthermore, by forming the projecting part 24b that serves as the spacer layer 21 in the signal line and by forming the projecting part 24a that serves as the auxiliary spacer layer 22 at a place other than the signal line, it is possible to form the spacer layer 21 and the auxiliary spacer layer 22 having different heights in the same process. Furthermore, when the planarization film 12 is to be formed, the planarization film 12 is formed with another insulating layer being held between it and the planarization films 17 or desired projecting parts 24a and 24b are formed at the stage in which the insulating layer is formed, thereby making it possible to adjust the heights of the projecting parts 24a and 24b as appropriate.

Second Embodiment

Figure 4:
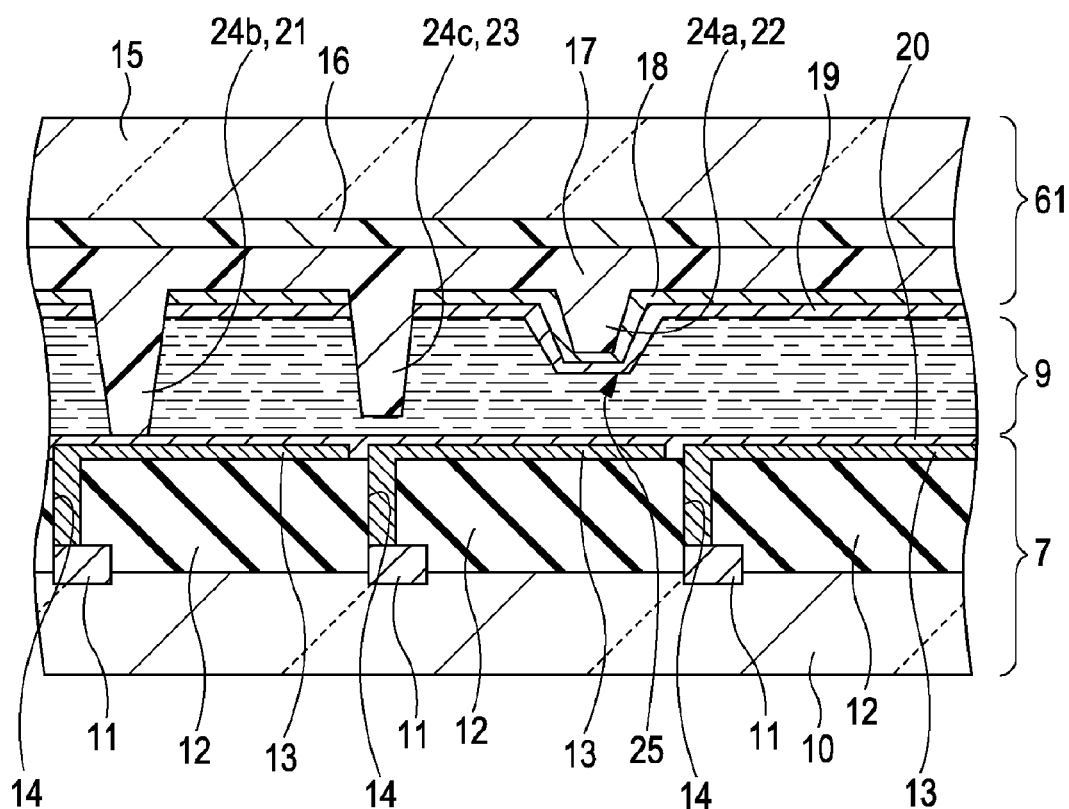
FIG. 4 is a schematic cross-sectional diagram of a liquid-crystal display device according to a second embodiment of the present invention.

FIG. 4 shows a schematic configuration of a liquid-crystal display device 2 according to a second embodiment of the present invention. The liquid-crystal display device 2 of the present exemplary embodiment is a liquid-crystal display device having a sensor function capable of detecting a touched position. In the present exemplary embodiment, components corresponding to those in FIG. 1 are designated with the same reference numerals, and duplicated descriptions thereof are omitted.

The liquid-crystal display device 2 includes the array substrate 7 on the side where a plurality of TFTs 11 are formed, and an opposing substrate 61 provided so as to oppose the array substrate 7. Then, the liquid-crystal display device 2 is constituted by the array substrate 7, the opposing substrate 61, and a liquid-crystal layer 9 having a predetermined thickness, which is formed between the two substrates.

The opposing substrate 61 in the liquid-crystal display device 2 of the present exemplary embodiment has a projecting part 24c that serves as an auxiliary spacer layer 23 in addition to the projecting parts 24a and 24b that serve as the spacer layer 21 and the sensor adjustment layer 22, respectively, which are integrally formed with the planarization film 17. Then, a common electrode 18 and an orientation film 19 are formed in sequence on the entire surface excluding the spacer layer 21 and the auxiliary spacer layer 23.

The auxiliary spacer layer 23 is formed at a height a little lower than the spacer layer 21, and acts as an auxiliary to the spacer layer 21 that defines the cell thickness. In the configuration in which only the spacer layer 23 is increased to prevent unnecessary modification of the liquid-crystal display device 1 due to a vertical external pressure applied to the array substrate 7 and the opposing substrate 61, the return of the liquid-crystal material from which the liquid-crystal layer 9 is formed will no longer follow the return with respect to the modification of the glass used for an insulation substrate 15 on the opposing substrate 61. If the speed at which the modification of the glass returns to the original is high and the speed at which the liquid-crystal material returns is slow, a problem arises in that air bubbles are generated in the liquid-crystal layer 9. In contrast, by forming the auxiliary spacer layer 23 so as to be lower than the height of the spacer layer 21, it is possible to obtain strength that prevents unnecessary modification when an external force is applied between the array substrate 7 and the opposing substrate 61. Moreover, it is possible to suppress occurrence of air bubbles due to a difference in the return speeds of the glass forming the insulation substrate 15 and the liquid-crystal layer 9.

The projecting part 23c forming the auxiliary spacer layer 23 can be formed on the opposing substrate 61 by increasing the number of exposure-to-light steps by one in the step of forming the projecting parts 24a and 24b, which is described in the first embodiment. As described in the first embodiment, in the case where the photosensitive resin film 17a is formed by applying a positive photosensitive resin material, and the projecting parts 24a, 24b, and 24c are to be formed by performing exposure to light and development thereon, the heights of the projecting parts 24a, 24b, and 24c can be controlled by adjusting only the amount of exposure to light, thereby enabling control with high accuracy. As described above, in a case where the projecting parts 24a, 24b, and 24c are to be formed using a positive photosensitive resin material, it is possible to form the spacer layer 21, the auxiliary spacer layer 23, and the sensor adjustment layer 22 independently of the applied film, the thickness of which is not easily controlled. Then, as described above, in a case where the heights of the projecting parts 24a, 24b, and 24c are to be controlled by adjusting only the amount of exposure to light, in the case that the heights of the projecting parts 24b and 24c that serve as the spacer layer 21 and the auxiliary spacer layer 23 are close to each other, it is also possible to form the projecting parts 24a, 24b, and 24c with high accuracy.

In the liquid-crystal display device 2 of the present exemplary embodiment, the surface of the opposing substrate 61 opposite to that of the liquid-crystal layer 9 is made to serve as a display screen. Furthermore, in the present exemplary embodiment, the pixel electrode 13 at a position opposing the sensor electrode 25 constitutes the opposing electrode according to an embodiment of the present invention. Then, in the liquid-crystal display device 2 of the present exemplary embodiment, the sensor electrode 25 formed on the opposing substrate 61 and the pixel electrode 13 (opposing electrode) on the array substrate 7, which is formed at a position opposing the sensor electrode 25, constitute a touch sensor.

In the liquid-crystal display device 2 having the above configuration, by applying a voltage between the common electrode 18 and the pixel electrode 13, the oriented state of the liquid crystal of the liquid-crystal layer 9 is changed. Then, for example, light from a light source (not shown), which is emitted from the array substrate 7 is modulated by this liquid-crystal layer 9, thereby causing a desired image to be displayed on the display screen.

Furthermore, in the liquid-crystal display device 2 of the present exemplary embodiment, for example, in a case where pressure is applied by a touch object, such as a hand or a finger, from outside the opposing substrate 61, the opposing substrate 61 is curved toward the array substrate 7. Then, the sensor electrode 25 at a position at which the pressure has been applied and the pixel electrode 13 at a position opposing the sensor electrode 25 are electrically connected to each other. By detecting the positions of the electrically connected sensor electrode 25 and pixel electrode 13, the position of the display screen touched by the touch object can be detected.

Advantages of the Second Embodiment

According to the present exemplary embodiment, by also integrally forming the auxiliary spacer layer 23 with the planarization film 17 similarly to the spacer layer 21 and the sensor adjustment unit 22 described in the first embodiment, the liquid-crystal display device can be formed to be resistant to an external pressure.

As described above, in a case where the auxiliary spacer layer 23 having a height lower than the spacer layer 21 is to be formed in addition to the spacer layer 21, by also integrally forming the auxiliary spacer layer 23 with the planarization film 17, the same advantages as those of the first embodiment, such as the peel strengths of the spacer layer 21, the auxiliary spacer layer 23, and the sensor adjustment layer 22 being capable of being improved, can be obtained.

Third Embodiment

Figure 5:
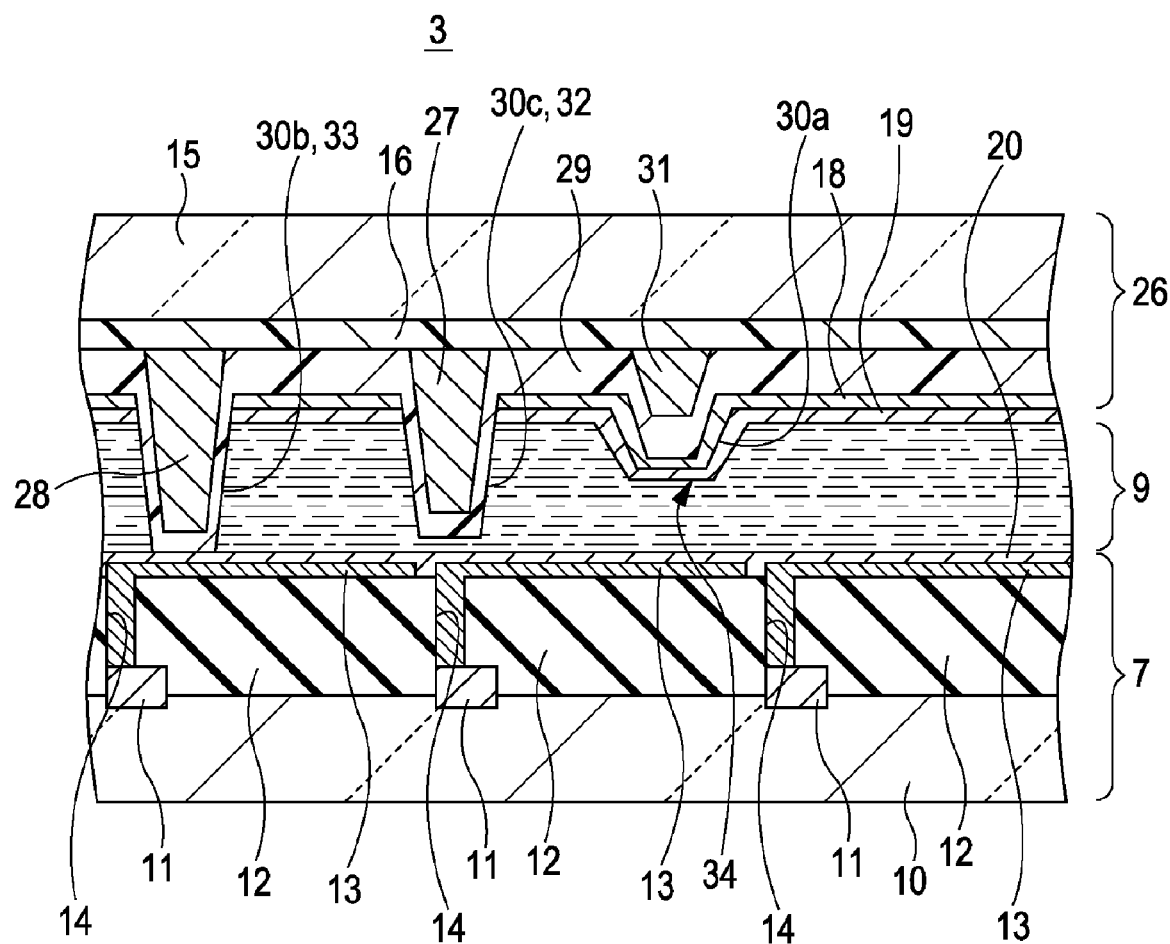
FIG. 5 is a schematic cross-sectional diagram of a liquid-crystal display device according to a third embodiment of the present invention.

FIG. 5 shows a schematic configuration of a liquid-crystal display device 3 according to a third embodiment of the present invention. The liquid-crystal display device 3 of the present exemplary embodiment is a liquid-crystal display device having a sensor function capable of detecting a touched position. In the present exemplary embodiment, components corresponding to those of FIG. 1 are designated with the same reference numerals, and duplicated descriptions thereof are omitted.

The liquid-crystal display device 3 includes the array substrate 7 on the side where a plurality of TFTs 11 are formed, and an opposing substrate 26 provided so as to oppose the array substrate 7. Then, the liquid-crystal display device 3 is constituted by the array substrate 7, the opposing substrate 26, and a liquid-crystal layer 9 having a predetermined thickness, which is formed between the two substrates.

On the opposing substrate 26 in the liquid-crystal display device 3 of the present exemplary embodiment, a first gap adjustment layer 28, a second gap adjustment layer 27, and a sensor adjustment layer 31 in a projecting form, which have different heights, are formed on a color filter layer 16. In the present exemplary embodiment, the first gap adjustment layer 28 is formed at the highest height, and the second gap adjustment layer 27 and the sensor adjustment layer 31 are formed at heights lower than the first gap adjustment layer 28.

Then, a planarization film 29 is applied and formed on the entire surface so as to cover the first gap adjustment layer 28, the second gap adjustment layer 27, and the sensor adjustment layer 31. In the present exemplary embodiment, as described above, the first gap adjustment layer 28, the second gap adjustment layer 27, and the sensor adjustment layer 31 each having a predetermined height are covered by the planarization film 29, and are integrally formed with the planarization film 29, thereby forming projecting parts 30a, 30b, and 30c having a predetermined height, respectively. That is, in the present exemplary embodiment, the first gap adjustment layer 28, the second gap adjustment layer 27, and the sensor adjustment layer 31 are used as adjustment layers for adjusting the heights of the projecting parts 30a, 30b, and 30c, respectively.

The projecting part 30b formed as a result of the first gap adjustment layer 28 being covered by the planarization film 29 is used as a spacer layer 33 for maintaining a predetermined cell thickness. Furthermore, the projecting part 30c formed as a result of the second gap adjustment layer 27 being covered by the planarization film 29 is used as an auxiliary spacer layer 32 so as to act as an auxiliary to alleviate an external pressure applied to the spacer layer 33.

Furthermore, also, in the present exemplary embodiment, similarly to the first and second embodiments, the common electrode 18 and the orientation film 19 are formed in sequence on the entire surface excluding the spacer layer 33 and the auxiliary spacer layer 32. As a result, in the present exemplary embodiment, the common electrode 18 formed on the projecting part 30a formed as a result of the sensor adjustment layer 31 being covered by the planarization film 29 is made to serve as a sensor electrode 34.

In the present exemplary embodiment, the projecting part 30a formed by the sensor adjustment layer 31 that is integrally formed with the planarization film 29 constitutes the sensor adjustment layer according to an embodiment of the present invention.

In the liquid-crystal display device 3 of the present exemplary embodiment, the surface of the opposing substrate 26 opposite to the surface of the liquid-crystal layer 9 is made to serve as a display screen. Furthermore, in the present exemplary embodiment, the pixel electrode 13 at a position opposing the sensor electrode 34 constitutes the opposing electrode according to an embodiment of the present invention. Then, in the liquid-crystal display device 3 of the present exemplary embodiment, the sensor electrode 34 formed on the opposing substrate 26 and the pixel electrode 13 (opposing electrode) on the array substrate 7 formed at a position opposing the sensor electrode 34 constitute a touch sensor. Here, the touch sensor is used to detect an external pressure applied to the display screen. For example, in a case where pressure is applied to the display screen by a touch object, such as a hand or a finger, it is possible to detect the touched position.

In the liquid-crystal display device 3 having the above configuration, by applying a voltage between the common electrode 18 and the pixel electrode 13, the oriented state of the liquid crystal of the liquid-crystal layer 9 is changed. Then, for example, light from a light source (not shown) emitted from the array substrate 7 is modulated by the liquid-crystal layer 9, thereby causing a desired image to be displayed on the display screen.

Furthermore, in the liquid-crystal display device 3 of the present exemplary embodiment, for example, in a case where pressure is applied from a touch object, such as a hand or a finger, from outside the opposing substrate 26, the opposing substrate 26 is curved toward the array substrate 7. Then, the sensor electrode 34 at a position at which the pressure has been applied and the pixel electrode 13 at a position opposing the sensor electrode 34 are electrically connected to each other. By detecting the positions of the electrically connected sensor electrode 34 and pixel electrode 13, it is possible to detect the position of the display screen touched by the touch object.

Advantages of the Third Embodiment

According to the liquid-crystal display device 3 of the present exemplary embodiment, the projecting parts 30a, 30b, and 30c are formed by the sensor adjustment layer 31, the first gap adjustment layer 28, the second gap adjustment layer 27, and the planarization film 29 formed so as to cover them. As described above, since the projecting parts 30a, 30b, and 30c are covered by the planarization film 29 formed on the entire surface of the substrate and are integrally formed with the planarization film 29, the area where the projecting parts 30a, 30b, and 30c are bonded with the surface of the layer below the projecting parts 30a, 30b, and 30c is the entire surface of the substrate. For this reason, since the peel surface of the projecting parts 30a, 30b, and 30c is the entire surface of the substrate, the same advantages as those of the first embodiment, such as the peel strength of the projecting parts 30a, 30b, and 30c being capable of being improved, are obtained.

Furthermore, in the present exemplary embodiment, although the projecting parts 30a, 30b, and 30c are integrated with the planarization film 29, the projecting parts 30a, 30b, and 30c are not collectively formed. For this reason, for the sensor adjustment layer 31, the first gap adjustment layer 28, and the second gap adjustment layer 27 for adjusting the heights of the projecting parts 30a, 30b, and 30c, materials that are not transparent, for example, a metal material such as a signal line, a negative resist such as a colored resist, a novolac positive resist, or an acrylic resist, can be used. Furthermore, a problem in terms of flatness, and a problem of degassing of ions do not strictly matter because the planarization film 29 is separately formed in the upper portion. For this reason, the number of choices of materials forming the first gap adjustment layer 28, the second gap adjustment layer 27, and the sensor adjustment layer 31 increases.

The first gap adjustment layer 28, the second gap adjustment layer 27, and the sensor adjustment layer 31 can be formed by applying the same material on the entire surface and by changing the number of exposures to light. Alternatively, it is also possible to form the first gap adjustment layer 28, the second gap adjustment layer 27, and the sensor adjustment layer 31 by using different materials. Furthermore, it is also possible to form the first gap adjustment layer 28, the second gap adjustment layer 27, and the sensor adjustment layer 31 on different layers. In a case where the first gap adjustment layer 28, the second gap adjustment layer 27, and the sensor adjustment layer 31 are to be formed using the same material, it is possible to reduce the number of steps.

Fourth Embodiment

Figure 6:
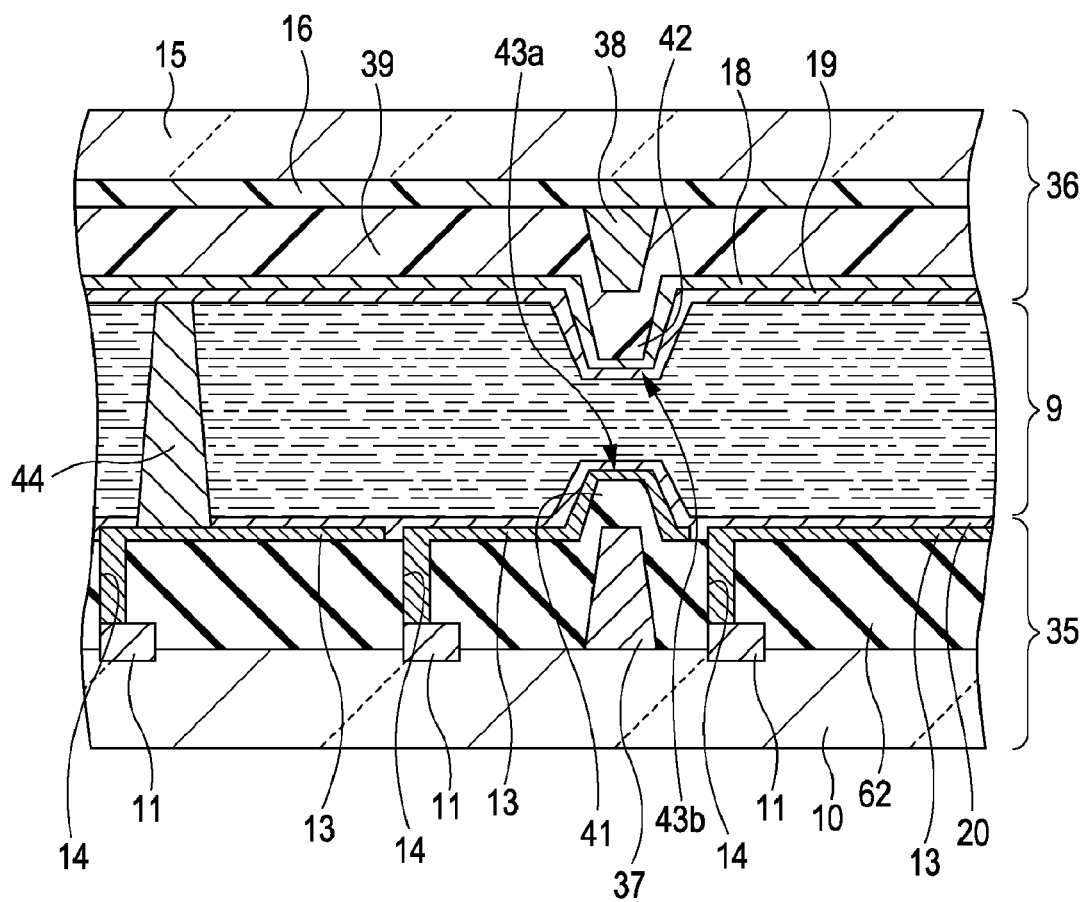
FIG. 6 is a schematic cross-sectional diagram of a liquid-crystal display device according to a fourth embodiment of the present invention.

FIG. 6 shows a schematic configuration of a liquid-crystal display device 4 according to a fourth embodiment of the present invention. The liquid-crystal display device 4 of the present exemplary embodiment is a liquid-crystal display device having a sensor function capable of detecting a touched position. In the present exemplary embodiment, components corresponding to those of FIG. 1 are designated with the same reference numerals, and duplicated descriptions thereof are omitted.

The liquid-crystal display device 4 includes an array substrate 35 on the side where a plurality of TFTs 11 are formed, and an opposing substrate 36 provided so as to oppose the array substrate 35. Then, the liquid-crystal display device 4 is constituted by the array substrate 35, the opposing substrate 36, and a liquid-crystal layer 9 having a predetermined thickness, which is formed between the two substrates.

The array substrate 35 is configured to include an insulation substrate 10 formed from glass in the shape of a transparent rectangular flat plate, and a plurality of TFTs 11 formed on the surface of the insulation substrate 10 facing the liquid-crystal layer 9. Furthermore, a first sensor adjustment layer 37 in a projecting form is formed at a position opposing a sensor electrode (to be described later) on the surface of the insulation substrate 10 facing the liquid-crystal layer 9. Then, a planarization film 62 is formed on the entire surface of the insulation substrate 10 in such a manner as to cover the TFTs 11 and the first sensor adjustment layer 37, and contact parts 14, from each of which a portion of the TFT 11 is exposed, are formed on the planarization film 62. The planarization film 62 is formed to planarize a portion other than the contact parts 14 and the first sensor adjustment layer 37 on the surface of the array substrate 35 facing the liquid-crystal layer 9. The first sensor adjustment layer 37 and the planarization film 62 formed thereon constitute a projecting part 41.

Then, the pixel electrodes 13 are pattern-formed in such a manner as to correspond to the respective pixels on the planarization film 62. The respective pixel electrodes 13 are connected to TFTs 11, which are switching elements, through the contact parts 14 formed on the planarization film 63. The pixel electrodes 13 are made to serve as transparent electrodes and are formed using, for example, ITO (Indium Tin Oxide). In the present exemplary embodiment, the pixel electrodes 13 formed on the projecting part 41 are made to serve as first sensor electrodes 43a.

Furthermore, a spacer layer 44 is formed at a predetermined position on the pixel electrode 13. This spacer layer 44 is formed to maintain the thickness of the liquid-crystal layer 9, that is, the cell thickness, so as to be constant within the plane and is formed at a height at which the cell thickness reaches a predetermined thickness.

Furthermore, on the pixel electrodes 13, an orientation film 20 is formed on the entire surface covering the pixel electrodes 13.

The opposing substrate 36 is constituted by a transparent insulation substrate 15, such as glass or polycarbonate (PC), a color filter layer 16 formed on the surface of the insulation substrate 15 facing the liquid-crystal layer 9, a second sensor adjustment layer 38 formed at a predetermined position on the color filter layer 16, and a planarization film 39.

The second sensor adjustment layer 38 is formed in a projecting form.

The planarization film 39 is formed on the entire surface so as to cover the second sensor adjustment layer 38, and this planarization film 39 allows an opening part of a pixel to be planarized. Then, the second sensor adjustment layer 38 and the planarization film 39 formed thereon constitute a projecting part 42.

Then, the common electrode 18 is formed on the entire surface of the planarization film 39, and the orientation film 19 is formed on the common electrode 18. In the present exemplary embodiment, the common electrode 18 formed on the projecting part 42 is made to serve as a second sensor electrode 43b.

In the present exemplary embodiment, the projecting parts 41 and 42 formed by the first and second sensor adjustment layers 37 and 38 that are integrally formed with the planarization films 62 and 39, respectively, constitute sensor adjustment layers according to an embodiment of the present invention.

Also, in the present exemplary embodiment, the liquid-crystal layer 9 is formed in such a manner that the array substrate 35 and the opposing substrate 36 are laminated, with a predetermined cell thickness being maintained using a spacer layer 44 so as for the orientation films 19 and 20 to face inward, and a liquid crystal is sealed between the array substrate 35 and the opposing substrate 36.

The first and second sensor adjustment layers 37 and 38 are formed as adjustment layers for adjusting the heights of the projecting parts 41 and 42, respectively, that is, are layers provided to adjust the distance between the first sensor electrode 43a and the second sensor electrode 43b. It is necessary that the first sensor electrode 43a and the second sensor electrode 43b be not connected in a state in which an external pressure is not applied to the liquid-crystal display device 4. For this reason, the first and second sensor adjustment layers 37 and 38 are set at heights at which the first sensor electrode 43a does not contact the second sensor electrode 43b opposing the first sensor electrode 43a at the cell thickness maintained by the spacer layers 44.

In the present exemplary embodiment, the second sensor electrode 43b constitutes the opposing electrode according to an embodiment of the present invention.

In the liquid-crystal display device 4 of the present exemplary embodiment, the surface of the opposing substrate 35 opposite to the surface of the liquid-crystal layer 9 is made to serve as a display screen. Furthermore, in the present exemplary embodiment, one of the sensor electrodes at a position opposing the other sensor electrode constitutes the opposing electrode according to an embodiment of the present invention. Furthermore, in the liquid-crystal display device 4 of the present exemplary embodiment, the first sensor electrode 43a formed on the array substrate 35 and the second sensor electrode 43b (opposing electrode) on the opposing substrate 36 formed at a position opposing the first sensor electrode 43a constitute a touch sensor. Here, the touch sensor is used to detect an external pressure applied to the display screen. For example, in a case where pressure is applied to the display screen by a touch object, such as a hand or a finger, it is possible for the touch sensor to detect the touched position.

In the liquid-crystal display device 4 having the above configuration, by applying a voltage between the common electrode 18 and the pixel electrode 13, the oriented state of the liquid crystal of the liquid-crystal layer 9 is changed. Then, for example, light from a light source (not shown) emitted from the array substrate 35 is modulated, thereby causing a desired image to be displayed on the display screen.

Furthermore, in the liquid-crystal display device 4 of the present exemplary embodiment, for example, in a case where pressure is applied by a touch object, such as a hand or a finger, from outside the opposing substrate 36, the opposing substrate 36 is curved toward the array substrate 35. Then, the first sensor electrode 43a at the position at which the pressure has been applied is electrically connected to the second sensor electrode 43b at a position opposing the first sensor electrode 43a. By detecting the positions of the electrically connected first sensor electrode 43a and second sensor electrode 43b, it is possible to detect the position of the display screen touched by the touch object.

Advantages of the Fourth Embodiment

In the liquid-crystal display device 4 of the present exemplary embodiment, by forming the projecting parts 41 and 42 on both the opposing substrate 36 and the array substrate 35, even in a case where it is difficult to sufficiently achieve the heights of the projecting parts 41 and 42 due to the characteristics of the material for the planarization films 62 and 39, the liquid-crystal display device 4 capable of exhibiting a sensor function with high accuracy can be formed.

Then, in the present exemplary embodiment, similarly to the third embodiment example, the projecting parts 41 and 42 are formed by the first sensor adjustment layer 37, the second sensor adjustment layer 38, and the planarization films 62 and 39 formed so as to cover them. As described above, since the projecting parts 41 and 42 are covered by the planarization films 62 and 39 formed on the entire surface of the substrate, respectively, and are integrally formed with the planarization films 62 and 39, the area where the projecting parts 41 and 42 are bonded with the surface of the layer below the projecting parts 41 and 42 is the entire surface of the substrate. For this reason, since the peel surface of the projecting parts 41 and 42 is the entire surface of the substrate, advantages, such as the peel strength of the projecting parts 41 and 42 being capable of being improved, are obtained.

In the present exemplary embodiment, an example is described in which the first sensor adjustment layer 37 and the second sensor adjustment layer 38 in a projecting form are formed, and thereafter, the planarization films 62 and 39 are formed to form the projecting parts 41 and 42, respectively. In addition, similarly to the first embodiment, by light-exposing and developing a photosensitive resin film, the projecting parts 41 and 42 may be provided which are collectively formed integrally with the first sensor adjustment layer 37, the second sensor adjustment layer 38, and the planarization films 62 and 39. As described above, a method of collectively forming the first sensor adjustment layer 37 and the second sensor adjustment layer 38 with the planarization films 62 and 39, respectively, is effective in a case where a stepper tact is applied too much due to a thick film. Furthermore, the method is also effectively used in a case where it is difficult to well apply application materials that serve as the planarization films 62 and 39 to the shape of the first and second sensor adjustment layers 37 and 38. Furthermore, the method is also effective for a case where it is difficult to well form the shape of the projecting parts 41 and 42 by reflow.

Fifth Embodiment

Figure 7:
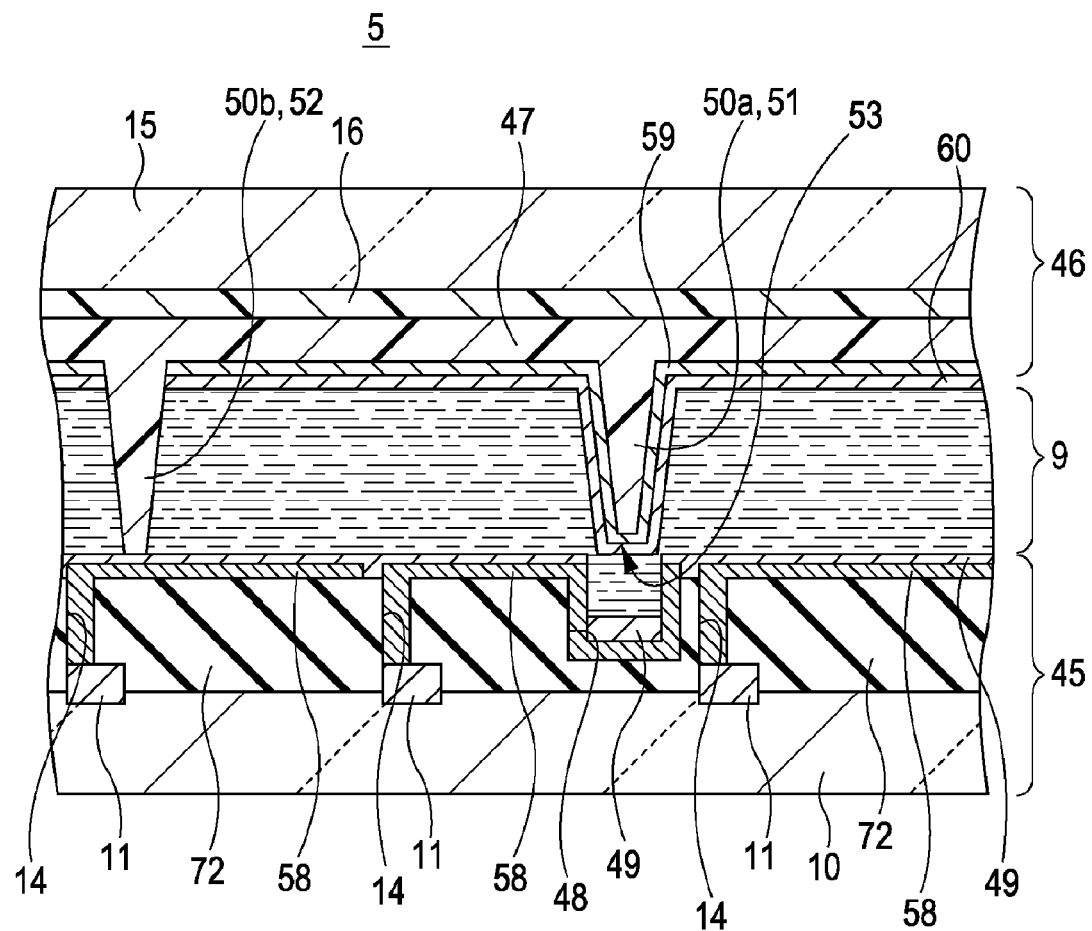
FIG. 7 is a schematic cross-sectional diagram of a liquid-crystal display device according to a fifth embodiment of the present invention.

FIG. 7 shows a schematic configuration of a liquid-crystal display device 5 according to a fifth embodiment of the present invention. The liquid-crystal display device 5 of the present exemplary embodiment is a liquid-crystal display device having a sensor function capable of detecting a touched position. In the present exemplary embodiment, components corresponding to those of FIG. 1 are designated with the same reference numerals, and duplicated descriptions thereof are omitted.

The liquid-crystal display device 5 includes an array substrate 45 on the side where a plurality of TFTs 11 are formed, and an opposing substrate 46 provided so as to oppose the array substrate 45. Then, the liquid-crystal display device 5 is constituted by the array substrate 45, the opposing substrate 46, and a liquid-crystal layer 9 having a predetermined thickness, which is formed between the two substrates.

The array substrate 45 is configured to include an insulation substrate 10 formed from glass in the shape of a transparent rectangular flat plate, and a plurality of TFTs 11 formed on the surface of the insulation substrate 10 facing the liquid-crystal layer 9. A plurality of the TFTs 11 are provided in an array form in such a manner as to correspond to the pixels.

Then, a planarization film 72 is formed on the entire surface of the insulation substrate 10 in such a manner as to cover the TFTs 11. On the planarization film 72, contact parts 14, from each of which a portion of the TFT 11 is exposed, is formed and also, a groove part 48 having a predetermined depth is formed at a position corresponding to a sensor electrode (to be described later) formed on the opposing substrate 46. The planarization film 72 is formed to planarize the portion other than the contact parts 14 and the groove part 48, that is, opening parts for the pixel, on the surface of the array substrate 45 facing the liquid-crystal layer 9.

Furthermore, pixel electrodes 58 are pattern-formed in such a manner as to correspond to the respective pixels on the planarization film 72. At this time, the pixel electrodes 58 are also formed inside the groove part 48 formed on the planarization film 72. The respective pixel electrodes 58 are connected to the TFTs 11, which are switching elements, through the contact parts 14 formed on the planarization film 72. These pixel electrodes 58 are formed as transparent electrodes, and is formed using, for example, ITO (Indium Tin Oxide).

Then, an orientation film 49 is formed on the entire surface of the pixel electrodes 58 in such a manner as to cover the pixel electrodes 58. Then, the depth of the groove part 48 is such that when the pixel electrodes 58 and the orientation film 49 are formed, these are not completely buried.

The opposing substrate 46 is constituted by a transparent insulation substrate 15, such as glass or polycarbonate (PC), a color filter layer 16 formed on the surface of the insulation substrate 15 facing the liquid-crystal layer 9, and a planarization film 47 formed on the color filter layer 16. Then, the opposing substrate 46 has projecting parts 50a and 50b that are integrally formed with the planarization film 47. In the present exemplary embodiment, the projecting parts 50a and 50b constitute a sensor adjustment layer 51 and a spacer layer 52, respectively. A common electrode 59 is formed on the entire surface excluding the spacer layer 52, and an orientation film 60 is formed on the common electrode 59.

The spacer layer 52 is formed to maintain the thickness of the liquid-crystal layer 9, that is, the cell thickness, so as to be constant within the plane, and is formed at a height at which the cell thickness reaches a predetermined thickness.

Then, in the present exemplary embodiment, the sensor adjustment layer 51 is also formed at the same height as the spacer layer 52, and the common electrode 59 formed on the sensor adjustment layer 51 is made to serve as a sensor electrode 53. Furthermore, regarding the array substrate 45 at a position opposing the sensor electrode 53 formed using the common electrode 59 formed on the sensor adjustment layer 51, the groove part 48 is formed on the planarization film 72, and a pixel electrode 58 is formed in such a manner as to enter the groove part 48. For this reason, in a state in which no external force is applied, the sensor electrode 53 and the pixel electrode 58 are not connected to each other. Furthermore, in the present exemplary embodiment, the pixel electrode 58 at a position opposing the sensor electrode 53 constitutes the opposing electrode according to an embodiment of the present invention. In the present exemplary embodiment, the sensor electrode 53 and the pixel electrode 58 (opposing electrode) formed in the groove part 48 of the array substrate 45, which opposes the sensor electrode 53, constitute a touch sensor.

In the liquid-crystal display device 5 having the above configuration, by applying a voltage between the common electrode 59 and the pixel electrode 58, the oriented state of the liquid crystal of the liquid-crystal layer 9 is changed, and a desired image is displayed. Furthermore, in the liquid-crystal display device 5 of the present exemplary embodiment, for example, in a case where pressure is applied by a touch object, such as a hand or a finger, from outside the opposing substrate 46, the opposing substrate 46 is curved toward the array substrate 45, and the sensor electrode 53 at a position where the pressure has been applied enters the groove part 48 formed on the array substrate 45 and is electrically connected to the pixel electrode 58 formed in the groove part 48. By detecting the positions of the electrically connected sensor electrode 53 and pixel electrode 58, it is possible to detect the touched position touched by the touch object.

Advantages of the Fifth Embodiment

In the liquid-crystal display device 5 of the present exemplary embodiment, projecting parts 50a and 50b that serve as the sensor adjustment layer 51 and the spacer layer 52, respectively, formed on the opposing substrate 46 are integrally formed with the planarization film 47. For this reason, the degree of contact between the opposing substrate 46; and the spacer layer 52 and the sensor adjustment layer 51 is increased, so that the peeling of the spacer layer 52 and the sensor adjustment layer 51 due to application of pressure to the liquid-crystal display device 5 is reduced.

Furthermore, according to the liquid-crystal display device 5 of the present exemplary embodiment, since the sensor adjustment layer 51 is formed at the same height as the spacer layer 52 that is used to define the cell thickness, steps, such as two exposures to light, are not necessary. For this reason, it is possible to form the sensor adjustment layer 51 without increasing the number of steps.

Sixth Embodiment

Figure 8:
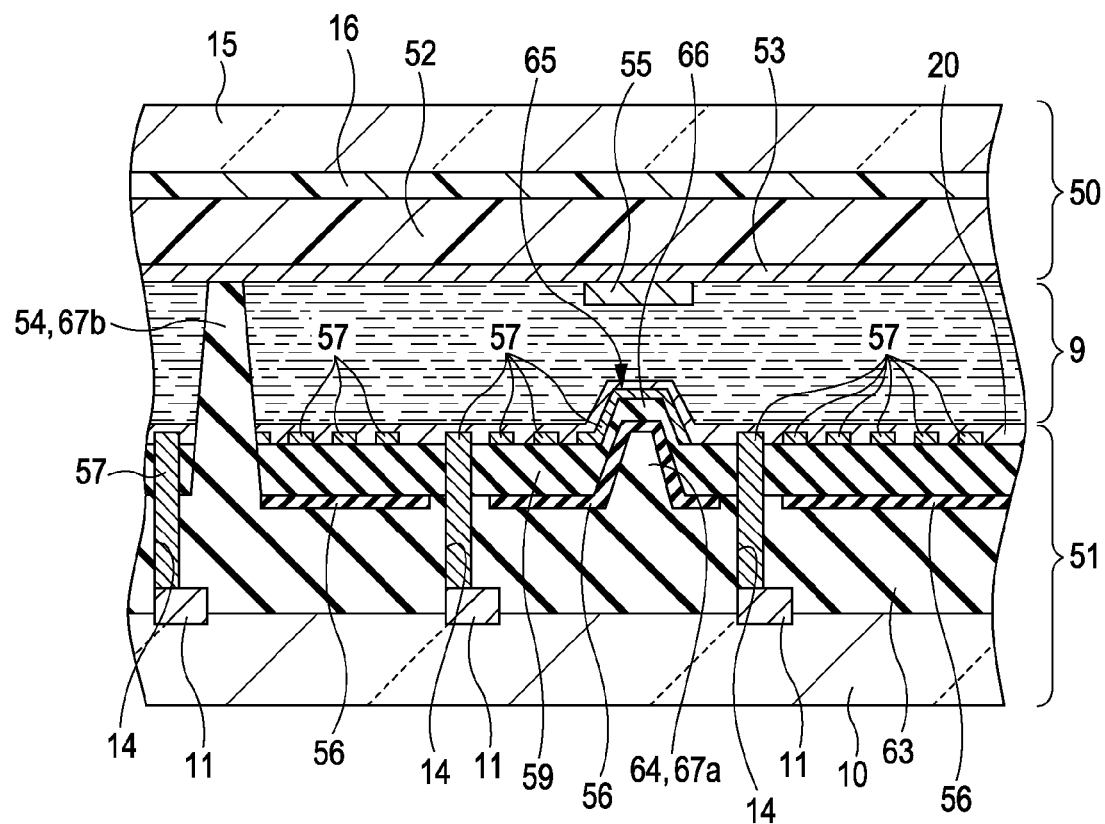
FIG. 8 is a schematic cross-sectional diagram of a liquid-crystal display device according to a sixth embodiment of the present invention.

FIG. 8 shows a schematic configuration of a liquid-crystal display device 6 according to a sixth embodiment of the present invention. The liquid-crystal display device 6 of the present exemplary embodiment is a liquid-crystal display device having a sensor function capable of detecting a touched position. In the present exemplary embodiment, components corresponding to those of FIG. 1 are designated with the same reference numerals, and duplicated descriptions thereof are omitted.

The liquid-crystal display device 6 includes an array substrate 51 on the side where a plurality of TFTs 11 are formed, and an opposing substrate 50 provided so as to oppose the array substrate 51. Then, the liquid-crystal display device 6 is constituted by the array substrate 51, the opposing substrate 50, and a liquid-crystal layer 9 having a predetermined thickness, which is formed between the two substrates.

The array substrate 51 is configured to include an insulation substrate 10 formed from glass in the shape of a transparent rectangular flat plate, and a plurality of TFTs 11 formed on the surface of the insulation substrate 10 facing the liquid-crystal layer 9. The plurality of the TFTs 11 are provided in an array form in such a manner as to correspond to the pixels. Then, a planarization film 63 is formed on the entire surface of the insulation substrate 10 in such a manner as to cover the TFTs 11, and projecting parts 67a and 67b that are integrally formed with the planarization film 63 are formed. The projecting part 67a is made to serve as a sensor adjustment layer 64, and the projecting part 67b is made to serve as a spacer layer 54. A common electrode 56 is formed on the planarization film 63 excluding the spacer layer 54. Then, an interlayer insulating film 59 is formed on the entire surface excluding the spacer layer 54 on the common electrode 56, and pixel electrodes 57 corresponding to the respective pixels are formed on the interlayer insulating film 59. The pixel electrodes 57 are connected to the TFTs 11 through the contact parts 14 formed so as to go through the interlayer insulating film 59 and the planarization film 63. Furthermore, at this time, in order that the pixel electrode 57 and the common electrode 56 are not short-circuited in the contact part 14, the common electrode 56 is formed on the planarization film 63 and the sensor adjustment layer 64 excluding the contact part 14. Then, an orientation film 20 is formed in such a manner as to cover the pixel electrodes 57. Furthermore, the projecting part 67a that is integrally formed with the planarization film 63 of the present exemplary embodiment and the interlayer insulating film 59 formed thereon constitute a projecting part 66 formed of a plurality of layers.

The spacer layer 54 is formed to maintain the thickness, that is, the cell thickness, so as to be constant within the plane, and is formed at a height at which the cell thickness reaches a predetermined thickness. Therefore, the spacer layer 54 that is integrally formed with the planarization film 63 is formed in a projecting form at a height enough to have a sufficient height that is the cell thickness of the liquid-crystal layer 9 at the time when the common electrode 56, the interlayer insulating film 59, the pixel electrode 57, and the orientation film 20 are formed on the planarization film 63. Furthermore, the sensor adjustment layer 64 is formed so as to be lower than the spacer layer 54, and the pixel electrode 57 formed on the sensor adjustment layer 64 and on the projecting part 66 including an interlayer insulating film is made to serve as a sensor electrode 65. That is, the sensor adjustment layer 64 is used to achieve the height of the sensor electrode 65. In the present exemplary embodiment, the projecting part 66 constitutes the sensor adjustment layer according to an embodiment of the present invention.

The opposing substrate 50 is constituted by a transparent insulation substrate 15, such as glass or polycarbonate (PC), a color filter layer 16 formed on the surface of the insulation substrate 15 facing the liquid-crystal layer 9, and a planarization film 52 formed on the color filter layer 16. Then, an orientation film 53 is formed on the entire surface of the planarization film 52, and an opposing electrode 55 is formed on the orientation film 53 in a portion of the array substrate 51 opposing the sensor electrode 65.

Also, in the present exemplary embodiment, the liquid-crystal layer 9 is formed in such a manner that the array substrate 51 and the opposing substrate 50 are laminated so as to maintain a predetermined cell thickness using the spacer layer 54 with the orientation films 20 and 53 facing inward, and a liquid crystal is sealed between the array substrate 51 and the opposing substrate 50. Furthermore, the liquid-crystal display device 6 of the present exemplary embodiment is a liquid-crystal display device in an FFS (Fringe Field Switching) mode.

In the liquid-crystal display device 6 of the present exemplary embodiment, the surface of the opposing substrate 50 opposite to that of the liquid-crystal layer 9 is made to serve as a display screen. Furthermore, in the liquid-crystal display device 6 of the present exemplary embodiment, a sensor electrode 65 formed on the array substrate 51 and an opposing electrode 55 on the opposing substrate 50, which is formed at a position opposing the sensor electrode 65, constitute a touch sensor. Here, the touch sensor is used to detect an external pressure applied to the display screen, and in a case where, for example, pressure is applied to the display screen by a touch object, such as a hand or a finger, the touch sensor can detect the touched position.

In the liquid-crystal display device 6 having the above configuration, by applying a voltage between the common electrode 56 and the pixel electrode 57, the oriented state of the liquid crystal of the liquid-crystal layer 9 is changed. Then, for example, light from a light source (not shown), which is emitted from the array substrate 51, is modulated by the liquid-crystal layer 9, thereby causing a desired image to be displayed on the display screen.

Furthermore, in the liquid-crystal display device 6 of the present exemplary embodiment, in a case where, for example, pressure is applied by a touch object, such as a hand or a finger, from outside the opposing substrate 50, the opposing substrate 50 is curved toward the array substrate 51. Then, the sensor electrode 65 at a position where the pressure has been applied is electrically connected to the opposing electrode 55 at a position opposing the sensor electrode 65. By detecting the positions of the electrically connected sensor electrode 65 and opposing electrode 55, it is possible to detect the position of the display screen touched by the touch object.

Advantages of the Sixth Embodiment

In the liquid-crystal display device 6 of the present exemplary embodiment, the projecting parts 67a and 67b that serve as the sensor adjustment layer 64 and the spacer layer 54, respectively, formed on the array substrate 51 are integrally formed with the planarization film 63. For this reason, the degree of contact between the array substrate 51; and the spacer layer 54 and the sensor adjustment layer 64 increases, so that the peeling of the spacer layer 54 and the sensor adjustment layer 64 due to application of pressure to the array substrate 51, or the like is reduced.

Furthermore, according to the liquid-crystal display device 6 of the present exemplary embodiment, even if a plurality of layers, such as the common electrode 56, the pixel electrode 57, and the interlayer insulating film 59, are laminated on the sensor adjustment layer 64 that is integrally formed with the planarization film 63, it is possible to obtain strength that can withstand an external pressure. Furthermore, in a case where it is necessary to consider damage due to an external pressure depending on the type of layer, lamination onto the sensor adjustment layer 64 may be avoided by patterning.

In the above-described first to sixth embodiments, an example is described in which projecting parts are used for a spacer layer and a sensor adjustment layer. As described above, in a liquid-crystal display device in which a sensor electrode is formed and a touch sensor is provided, operation is made possible by applying an external pressure to the display screen. As described above, even in a case where a load due to an external pressure is applied, the above-described embodiments can be effectively used.

The present invention is not limited to a liquid-crystal display device having a touch sensor in the manner described above. For example, the present invention can be applied to a liquid-crystal display device having, as an orientation controller for controlling the orientation mode of a liquid crystal, projecting parts that are integrally formed with a planarization film.

Seventh Embodiment

Figure 9:
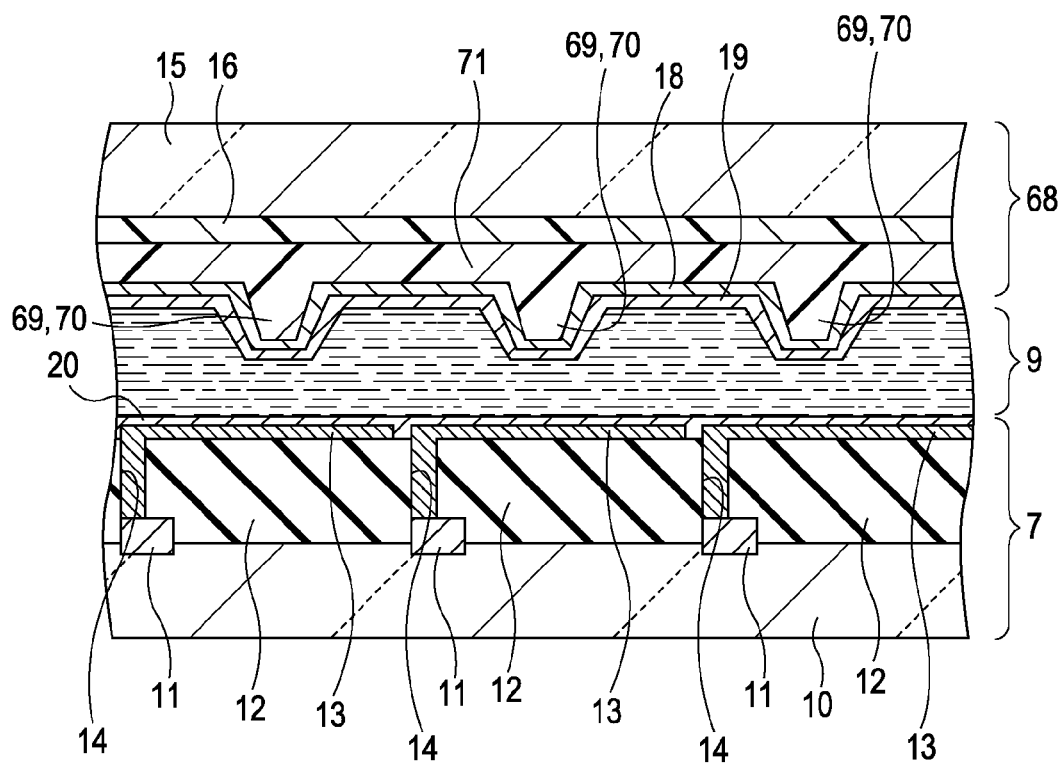
FIG. 9 is a schematic cross-sectional diagram of a liquid-crystal display device according to a seventh embodiment of the present invention.
Figure 10:
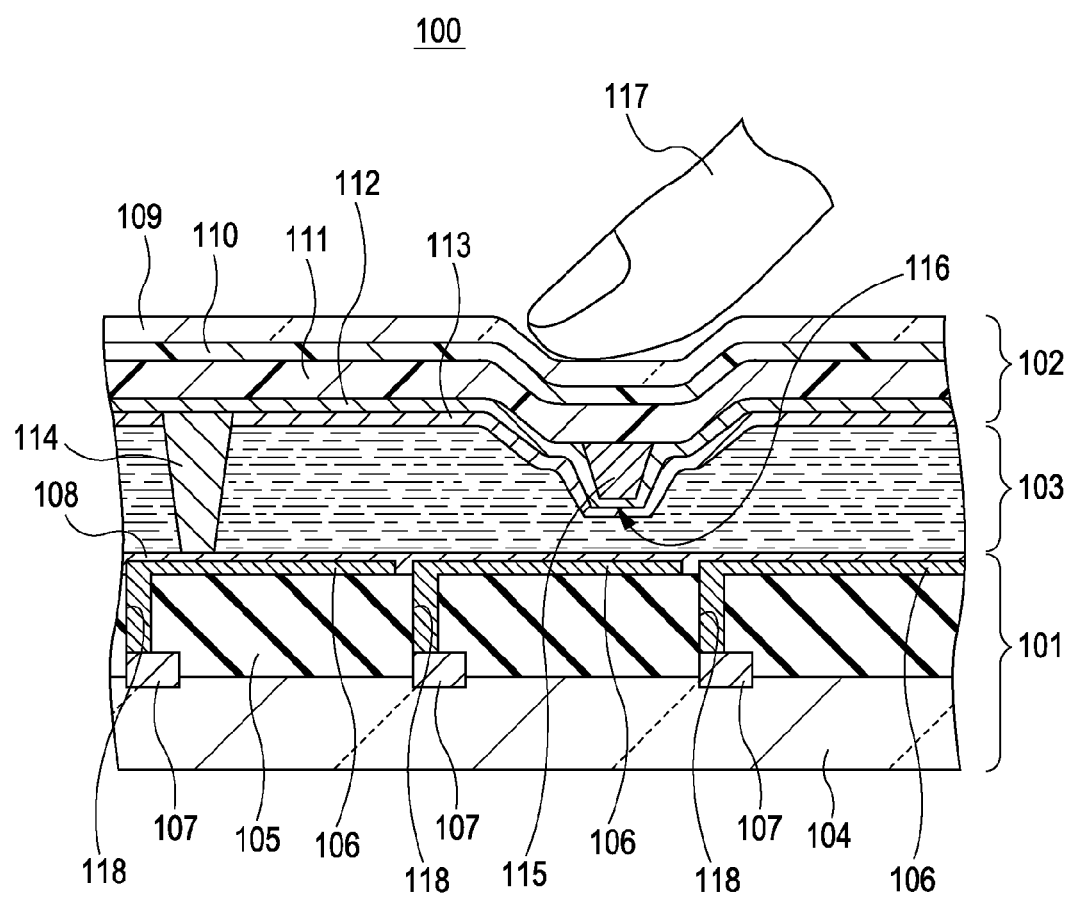
FIG. 10 is a schematic cross-sectional diagram of a liquid-crystal display device of the related art.

FIG. 9 shows a schematic configuration of a liquid-crystal display device 67 according to a seventh embodiment of the present invention. The liquid-crystal display apparatus 67 of the present exemplary embodiment is an example in which an orientation controller for controlling the orientation mode of a liquid crystal is formed. The orientation controller referred to herein is that called VAP (Vertical Alignment Protrusion) in a vertical orientation mode or the like. Components in FIG. 9, which correspond to those of FIG. 1, are designated with the same reference numerals, and duplicated descriptions thereof are omitted.

The liquid-crystal display device 67 includes the array substrate 7 on the side where a plurality of TFTs 11 are formed, and an opposing substrate 68 provided so as to oppose the array substrate 7. Then, the liquid-crystal display device 67 is constituted by the array substrate 7, the opposing substrate 68, and a liquid-crystal layer 9 having a predetermined thickness, which is formed between the two substrates.

The opposing substrate 68 in the liquid-crystal display device 67 of the present exemplary embodiment has projecting parts 70 that serves as orientation controllers 69 that are integrally formed with a planarization film 71. Then, a common electrode 18 and an orientation film 19 are formed in sequence on the entire surface of the planarization film 71 including the projecting parts 70 that serve as the orientation controllers 69.

The orientation controller 69 is used to control orientation in such a manner that the liquid crystal is inclined during the time of no magnetic-field and during the time in which a voltage is applied, an oblique electric field is produced on the basis of the distortion of the electric lines of force, and the liquid crystal is oriented in every direction with the orientation controller 69 being the center. That is, the orientation controller 69 works as an orientation factor.

In the liquid-crystal display device 67 of the present exemplary embodiment, the surface of the opposing substrate 68 opposite to that of the liquid-crystal layer 9 is made to serve as a display screen.

In the liquid-crystal display device 67 having the above configuration, by applying a voltage between the common electrode 18 and the pixel electrode 13, the oriented state of the liquid crystal of the liquid-crystal layer 9 is changed. Then, for example, light from a light source (not shown), which is emitted from the array substrate 7, is modulated by the liquid-crystal layer 9, thereby causing a desired image to be displayed on the display screen. Then, in a case where a voltage is applied between the common electrode 18 and the pixel electrode 13, the liquid crystal is oriented with the orientation controller functioning as a nucleus. As a result, the orientation of the liquid crystal is made to be in a radial form. As a result, in the liquid-crystal display device 67, when the display screen is viewed from the azimuth direction, apparent changes in luminance decrease, and wide viewing angle performance is obtained.

Advantages of the Seventh Embodiment

According to the liquid-crystal display device 67 of the present exemplary embodiment, the projecting part 70 that serves as the orientation controller 69 formed on the opposing substrate 68 is integrally formed with the planarization film 71. Thus, the degree of contact between the opposing substrate 68 and the orientation controller 69 increases, so that the peeling of the orientation controller 69 resulting from application of pressure to the opposing substrate 68 is reduced.

In the liquid-crystal display devices in the above-described first to seventh embodiments, it is possible to suppress the peeling of a projecting part due to an external pressure, and reliability against an external force is improved. This is effective for not only liquid-crystal display devices in which a touch sensor is incorporated, but also for all liquid-crystal display devices that are used in an environment with probability of receiving changes due to an external pressure, such as liquid-crystal display devices attached with a sensor that senses an external pressure, thin liquid-crystal display devices, or liquid-crystal display devices for use in windless conditions or the like. These liquid-crystal display devices can be applied to, for example, mobile electronic devices, such as mobile phones or digital cameras. Furthermore, in the present invention, an identical configuration can be used for a touch panel of a resistance film type mounted on an outer side of a liquid-crystal display device. In that case, also, this is effective for preventing a spacer layer from being peeled.

The present application contains subject matter related to that disclosed in Japanese Priority Patent Application JP 2008-203433 filed in the Japan Patent Office on Aug. 6, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid-crystal display device comprising:
a first substrate;
a second substrate opposing the first substrate;
a liquid-crystal layer with a predetermined thickness between the first substrate and the second substrate;
a planarization film for planarizing the surface of the liquid-crystal layer, the planarization film being on the surface of at least one of the first substrate and the second substrate facing the liquid-crystal layer;
projecting parts integrally formed with the planarization film; and
sensor electrodes on the projecting parts that are integrally formed with the planarization film,
wherein,
the projecting parts and the planarization film are made from a same material.

2. The liquid-crystal display device according to claim 1, wherein the projecting parts comprise spacer layers for maintaining the thickness of the liquid-crystal layer.

3. The liquid-crystal display device according to claim 1, wherein the projecting parts comprise:
a spacer layer for maintaining the thickness of the liquid-crystal layer; and
an auxiliary spacer layer formed so as to be lower than the spacer layer.

4. The liquid-crystal display device according to claim 1, further comprising:
opposing electrodes formed on the first substrate or the second substrate, the opposing electrodes opposing the sensor electrodes via the liquid-crystal layer and that are formed so as to be connected to the sensor electrodes as a result of the curving of the first substrate or the second substrate,
wherein the projecting parts are formed in such a manner that the heights of the projecting parts are less than the thickness of the liquid-crystal layer.

5. The liquid-crystal display device according to claim 1, wherein the projecting parts comprise orientation controllers for controlling the orientation of a liquid crystal forming the liquid-crystal layer.

6. The liquid-crystal display device according to one of claims 1 to 5, wherein the heights of the projecting parts are adjusted using an adjustment layer formed below the planarization film.

7. The liquid-crystal display device according to one of claims 1 to 5, wherein the projecting parts are formed in such a manner that a plurality of different layers are laminated.

8. The liquid-crystal display device according to one of claims 1 to 6, wherein the projecting parts are formed in non-opening parts.

9. The liquid-crystal display device according to claim 3, further comprising a common electrode on an entire surface of the planarization film excluding the spacer layer.

10. The liquid-crystal display device according to claim 3, wherein the spacer layer and the auxiliary spacer layer are at a position where they are light-shielded by a light-shielding film.

* * * * *